Aug. 2, 1932.  A. DINA  1,869,887
CLUTCH OPERATING MECHANISM
Filed Dec. 28, 1929  5 Sheets-Sheet 1

INVENTOR
Augusto Dina
BY
Howard W. Dix,
ATTORNEY

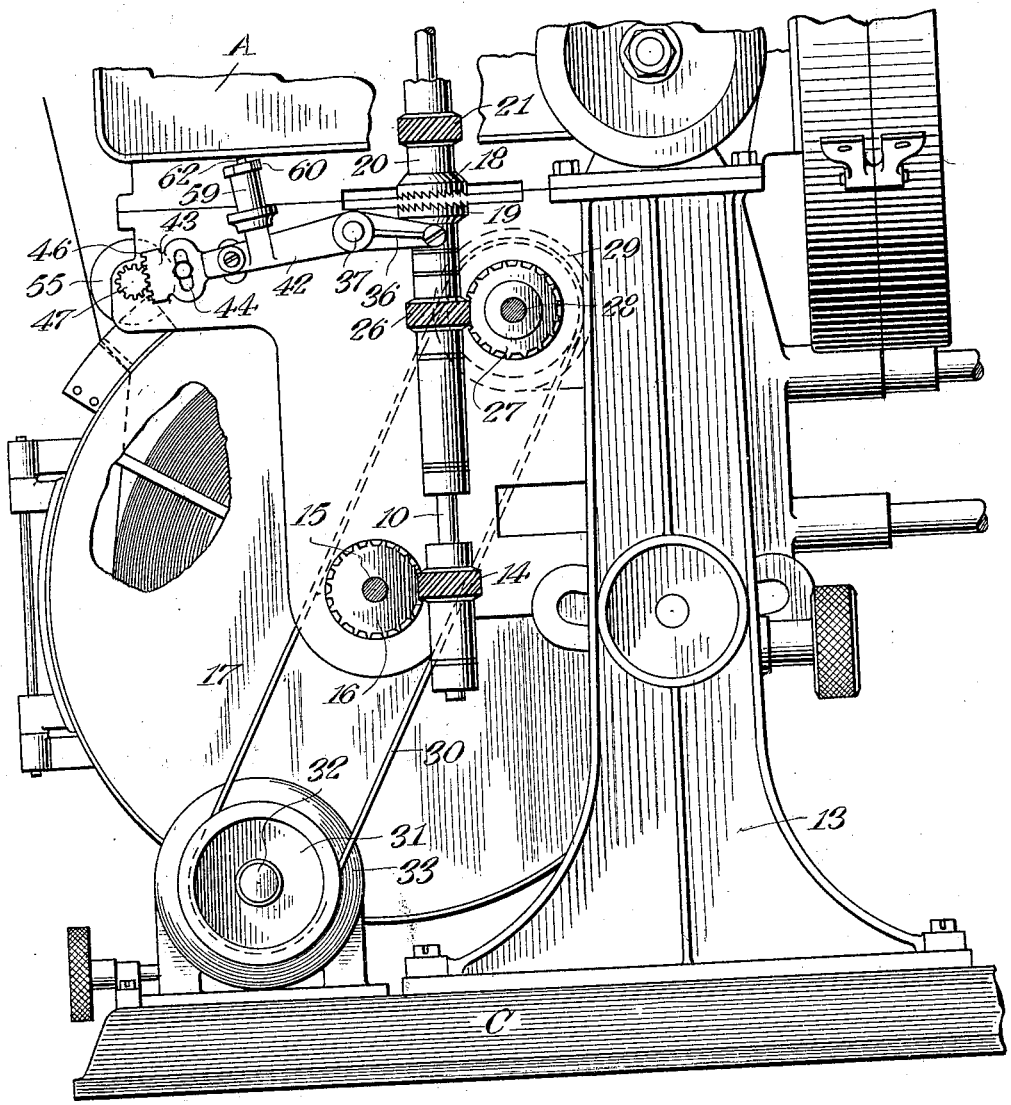

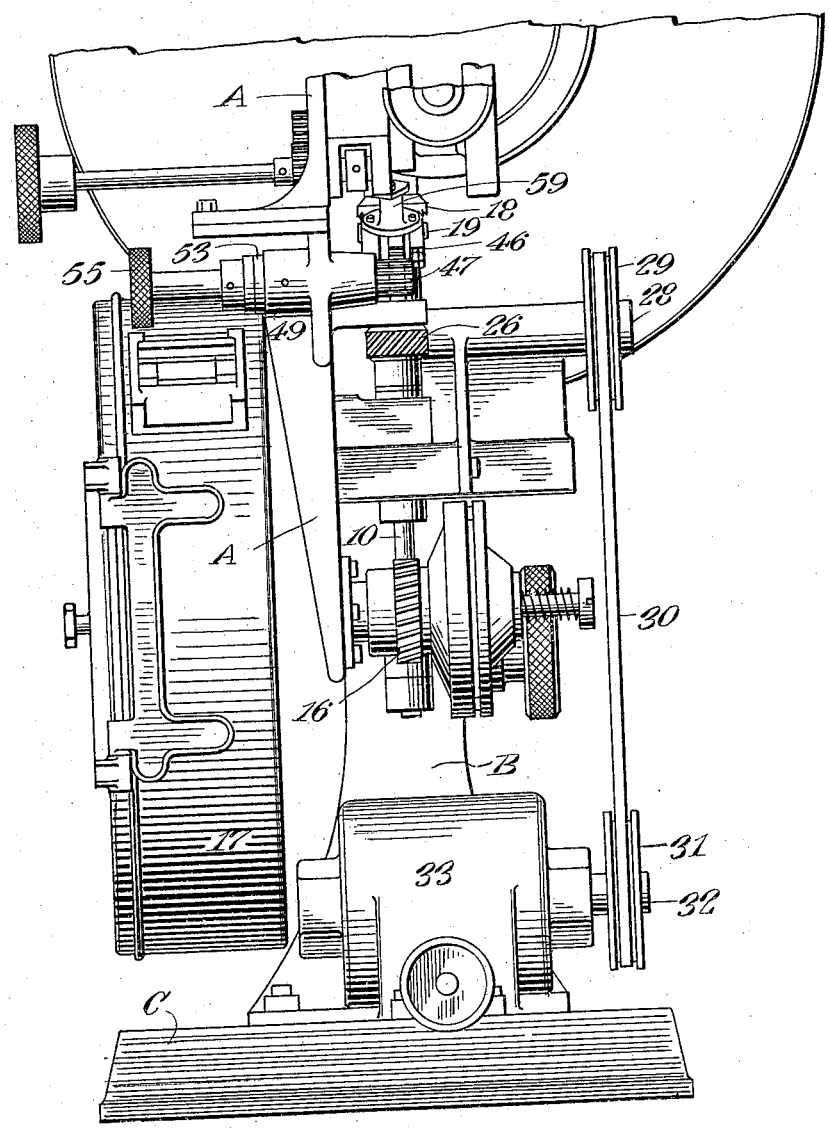

Aug. 2, 1932.  A. DINA  1,869,887

CLUTCH OPERATING MECHANISM

Filed Dec. 28, 1929  5 Sheets-Sheet 4

INVENTOR
Augusto Dina
BY
Howard W. Dey
ATTORNEY

Aug. 2, 1932.  A. DINA  1,869,887

CLUTCH OPERATING MECHANISM

Filed Dec. 28, 1929   5 Sheets-Sheet 5

INVENTOR
Augusto Dina
BY
Howard W. Day
ATTORNEY

Patented Aug. 2, 1932

1,869,887

UNITED STATES PATENT OFFICE

AUGUSTO DINA, OF ELIZABETH, NEW JERSEY, ASSIGNOR TO INTERNATIONAL PROJECTOR CORPORATION, OF NEW YORK, N. Y., A CORPORATION OF DELAWARE

CLUTCH OPERATING MECHANISM

Application filed December 28, 1929. Serial No. 417,118.

This invention relates to new and useful improvements in clutch operating mechanisms.

The main object of the invention is to provide a simple durable and efficient clutch mechanism which is capable of being quickly and easily adjusted to the open or closed position and readily locked in either position at will.

A further object is to provide an improved construction wherein the clutch faces may be moved to engaging position and the clutch actuating mechanism may be locked in closed position even tho the faces may not be fully in normal engaging position. In addition the invention contemplates the provision of an automatic means whereby the faces of the clutch may be instantly moved to fully engaged position as soon as there is any relative rotative motion therebetween.

Further and more specific objects, features, and advantages will more clearly appear from the detailed description given below when taken in connection with the accompanying drawings which form part of the specification and which illustrate one present preferred form of the invention.

The invention in general comprises a clutch mechanism which includes an operating device formed of two arms one of which is positively driven and capable of being adjusted and locked positively in any one of several positions. The other arm is moved by the first arm movement but between the two arms there is disposed a resilient member such as a spring whereby a certain amount of movement is permitted one of the arms without affecting the movement of the other. Preferably the second arm carries one of the clutch elements or faces. With this general construction the first arm may be adjusted and locked in, for instance, the closed position even tho the clutch face on the other arm is not fully meshed with its associated clutch face but as soon as the parts get into meshing position then the resilient member will come into play and force the proper engagement.

The broad idea, therefore, is to provide a two piece clutch operating mechanism with a resilient element between them so that a certain amount of relative movement is permitted for the purposes above mentioned. This construction is particularly adapted for use on motion picture machines such as projectors where the drive shaft includes means for driving the lower magazine mechanism as well as the other driven elements of the projector. When it is desired to rewind the film, the only portion necessary to be driven is the lower magazine and therefore during this time it is desirable to cut off the other driven elements from the drive shaft. This is done by providing a clutch so disposed that when it is opened only the lower magazine mechanism is actuated by the drive shaft. It is desirable to be able to accurately adjust the clutch elements and to lock them in either the open or closed position and to this end the one element of the operating member is adjustable and capable of being locked in either position at any time. The other member carrying one of the clutch faces is mounted to move relatively to the first member, and therebetween is disposed the cushion or resilient device, preferably in the form of a spring which acts as above generally described and as will be described more in detail as hereinafter set forth. The spring or cushion has always the tendency to force the clutch faces into proper mesh even tho when they first engage they may not be properly alined for the complete and proper transmission of power.

The present preferred form of the invention is shown in the drawings, in which,

Fig. 2 is a side elevation enlarged, of the lower portion of the machine showing the clutch disengaged;

Fig. 3 is a front elevation of the lower portion of the machine showing the clutch engaged;

Figure 1:
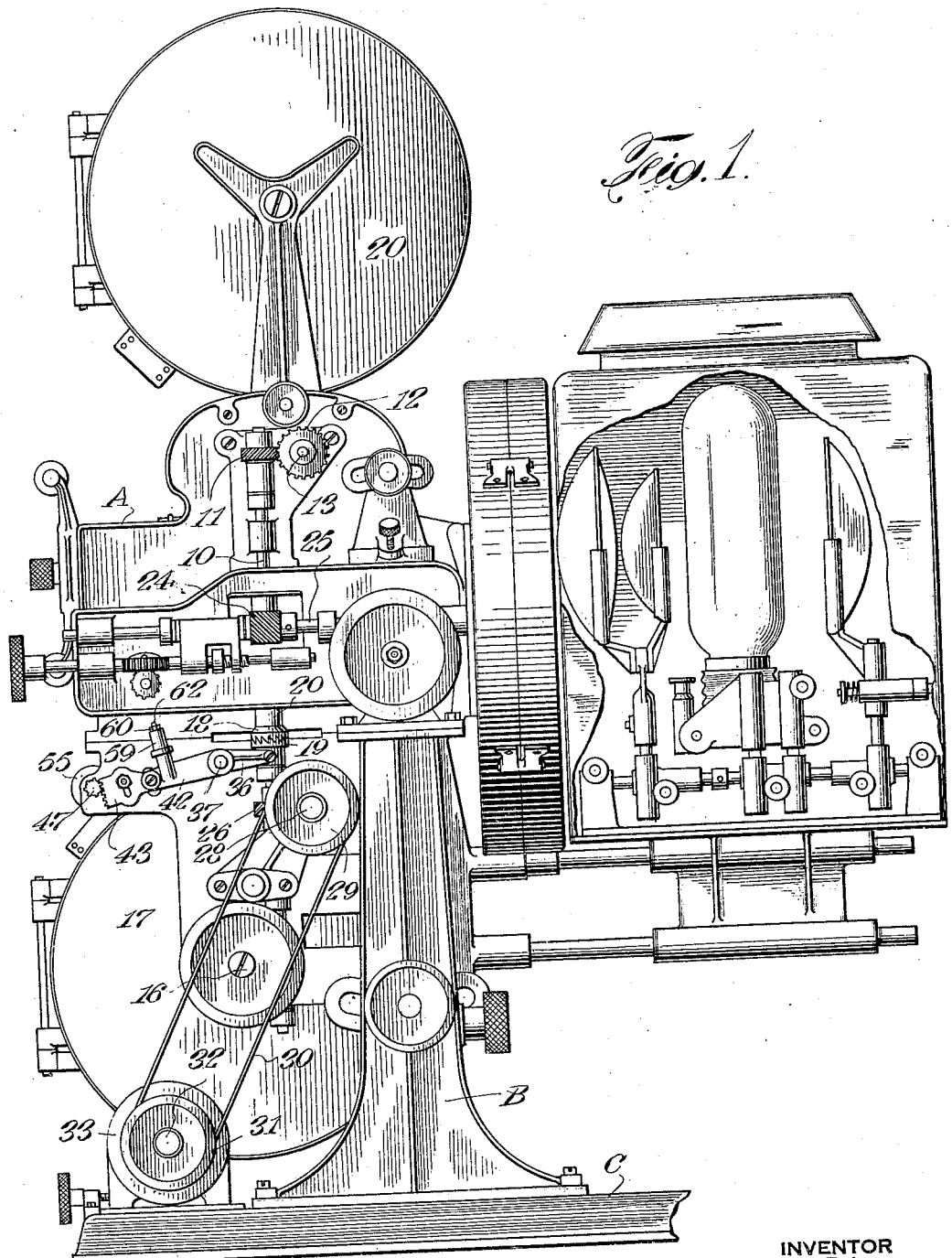
Fig. 1 is a side elevation with portions broken away of the machine to which the clutch mechanism may be applied.
Figure 5:
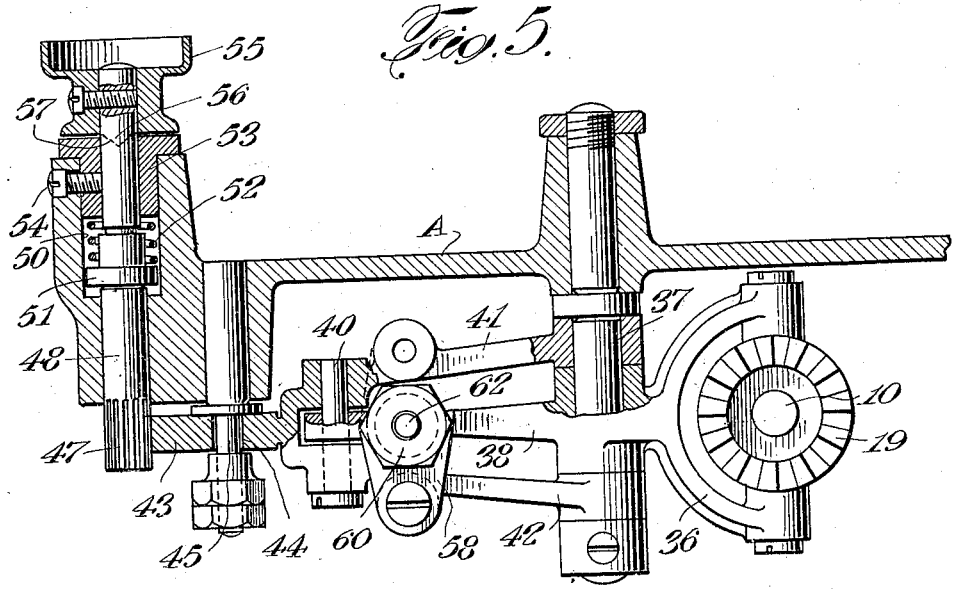
Fig. 5 is a plan view partly in section of the clutch parts.

The present preferred form of the invention is shown as applied to a motion picture projector which includes a projector head frame A, which, in turn is mounted for oscillation on a pedestal B extending upwardly from the base C. Preferably vertically disposed on the projection head frame A is the main drive shaft 10 for the projector. At the top of this shaft 10 there is a gear 11 meshing with a gear 12 on the shaft 13 for the upper film sprocket and at its lower end there is a gear 14 meshing with a gear 15 on the shaft 16 for the lower film magazine 17.

Intermediate this shaft 10 there is disposed a clutch device comprising the usual clutch members or faces 18 and 19 one of which 18 is fixed on a sleeve 20 keyed to the shaft 10 and which sleeve 20 carries at its upper end the gear 21 meshing with the gear 22 on the shaft 23 supporting the lower film sprocket. Above the gear 21 on the upper portion of the main drive shaft 10 there is also disposed a gear (not shown) meshing with a gear 24 on a shutter shaft 25. Below the clutch member or element 19 on the shaft 10 is disposed a gear 26 meshing with a gear 27 on the shaft 28 the other end of which carries a pulley 29 over which runs a belt 30 connecting to a pulley 31 on the shaft 32 of the driving motor 33.

The lower clutch element 19 is mounted on a sleeve 34 slidable and rotatable on the shaft 10 in the usual manner and this sleeve is encircled by a collar 35 connected to the ends of a yoke element 36 pivotally mounted on a shaft 37 connected to the projector head frame A. The other end of the yoke element is in the form of an arm 38 on the opposite side of the shaft 37. This arm 38 is provided with a transverse slot 39 therein through which passes a cross pin 40. This pin 40 extends between and is fixed to spaced arms 41 and 42 which are respectively pivoted also on the shaft 37 but separately from the yoke element 36.

The arms 41 and 42 at their ends away from the pivot shaft 37 are joined and extend beyond their juncture as an arm 43 which has therein a transverse slot 44 to receive a stub shaft or pin 45 connected to the frame A. The outer end of the arm 43 is provided with rack teeth 46 meshing with teeth on a gear 47 formed on one end of a shaft 48 disposed rotatively in the enlarged portion 49 of the frame A. This portion 49 has a chamber 50 therein in which slides a flange 51 on the shaft 48. This flange receives one end of a spring 52 the other end of which bears against the inner end of a plug 53 fastened in place by a screw 54. The outer end of the shaft 48 has fastened thereto a hand knob 55, the inner face of which is provided with a tongue 56 adapted in certain positions of the knob 55 to lie in a groove 57 in the adjacent face of the plug 53. When the shaft 48 is turned by turning the knob 55 the tongue 56 will be drawn out of the groove 57 thus causing a slight axial movement of the shaft 48 but causing the rotation of the gear 47 and thus the oscillation of the arm 43. The parts are so designed that when the handle or knob 55 is in position so that the tongue 56 engages with the groove 57, the arm 43 will be in either of its two extreme positions and that therefore the clutch will be engaged or disengaged.

Figure 7:
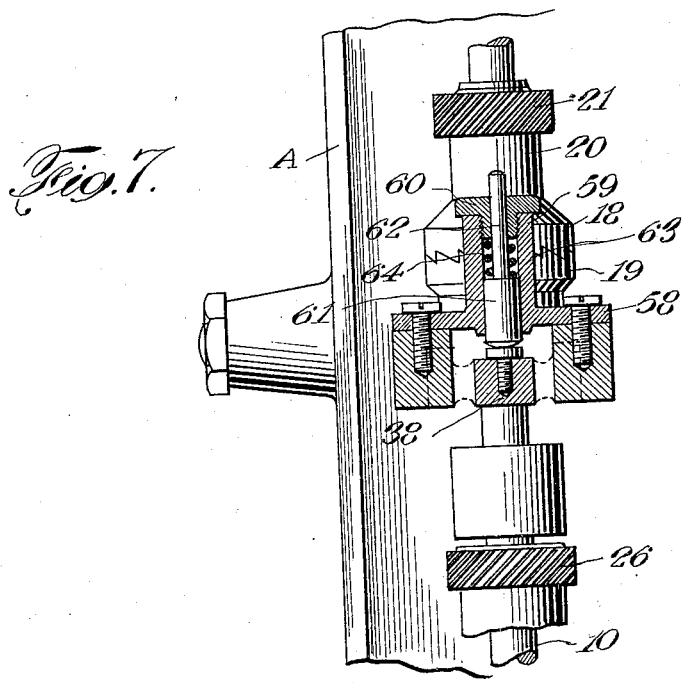

In order to provide the required cushioning effect or resilient relative motion between the arm 43 and the yoke member 36 the present invention provides (see especially Fig. 7) a cross bar 58 fastened at its ends to the arms 41 and 42 near the end of the arm 38. This cross bar 58 has an upright bored shell or cylinder 59 thereon the upper end of which is closed by a threaded plug 60. Within the cylinder 59 there is disposed a piston 61 having a stem 62 extending upwardly through the plug 60 and provided with a shoulder 63. Between this shoulder 63 and the under face of the plug 60 there is disposed a spring 64 which tends to force the piston 61 downwardly against the upper face of the arm 38. This tendency always keeps the yoke member 36 with the associated clutch face 19 in an upward position as near the other clutch face as possible.

Figure 4:
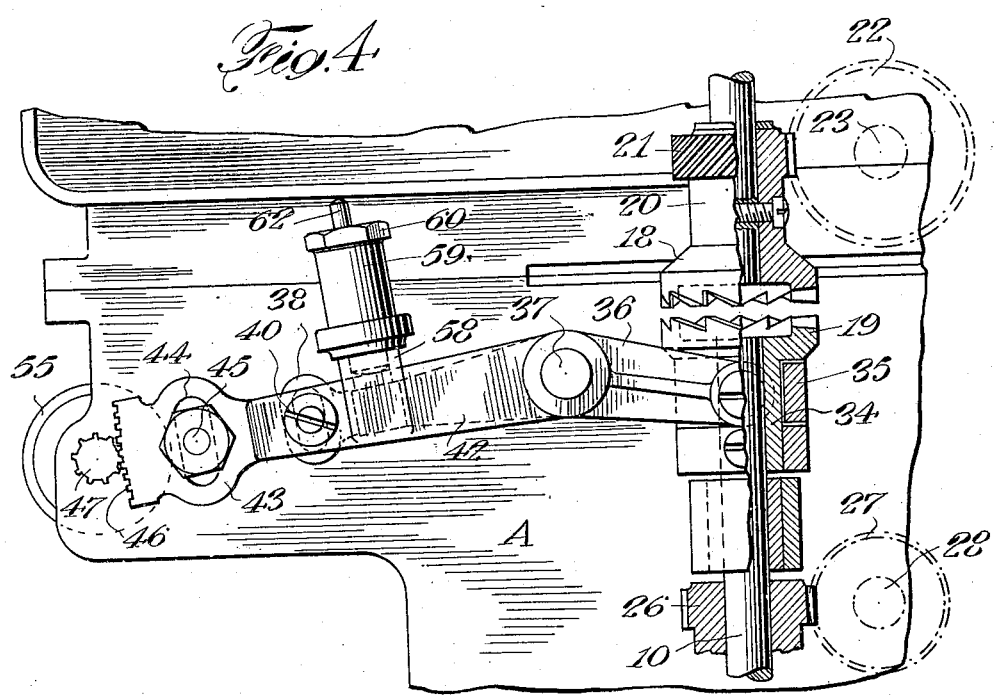
Fig. 4 is a detailed elevation of the clutch showing its parts disengaged.
Figure 6:
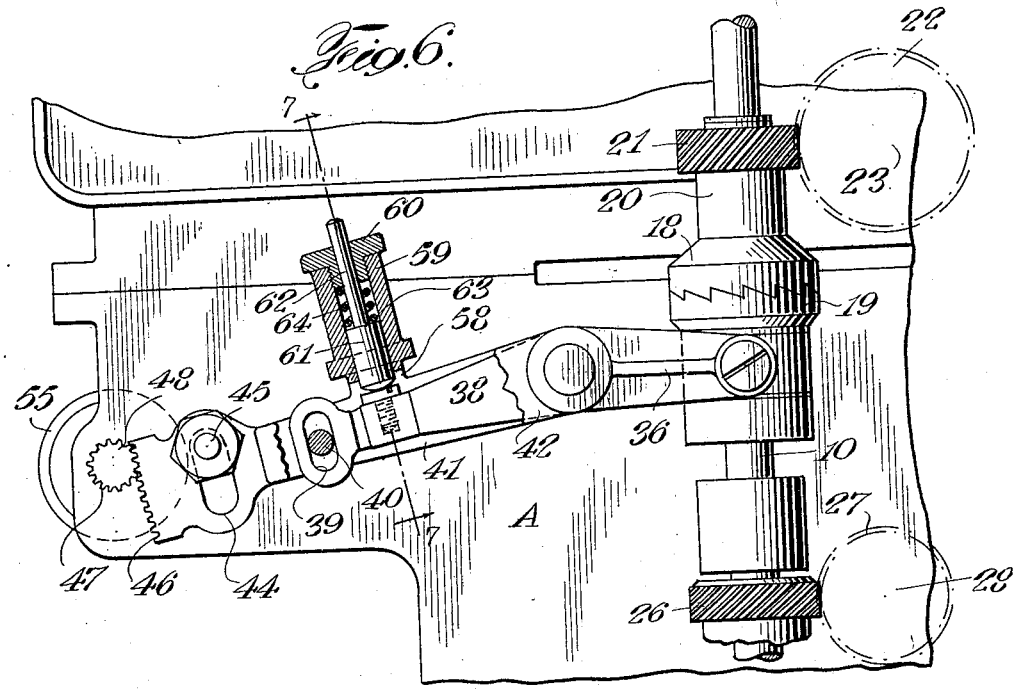
Fig. 6 is a vertical longitudinal section through the clutch in engaged position; and, Fig. 7 is a transverse vertical section taken on the line 7—7 of Fig. 6.

To consider the operation of the clutch member now as merely a clutch device and without regard as to what type of machine it is associated with, let us assume that the parts are in the position shown in Fig. 4 wherein the clutch faces 18 and 19 are shown as disengaged. It will be obvious that the handle or knob 55 can be moved to rotate the arm 43 clock-wise around the pivot shaft 37 and that when this movement has gone far enough the tongue 56 will drop into the slot or groove 57 and the knob 55 will be temporarily locked in this extreme position so that the clutch face 19 will be separated from the other clutch face 18. This amount of extreme upward movement of the arm 43 is also regulated by the engagement of the pin 45 in the slot 44 and these two elements are so designed that the pin comes to the end of the slot at the same time as the tongue 56 and the groove 57 above mentioned are locked or engaged as above described. It is therefore seen that to securely unlock or disengage the clutch it is merely necessary to turn the knob 55 in the proper direction until the locking action takes place whereupon the parts will temporarily be latched or locked in this position until the knob 55 is turned in the opposite direction.

When the turning of the knob 55 in the opposite direction takes place then the tongue 56 and the groove 57 are disengaged and as above mentioned the arm 43 is then moved downwardly around the pivot shaft or pin 37. Altho there is the cushioning action between the arm 43 and the yoke member 36 due to the action of the spring 64, the arm 38 associated with the yoke member 36 will move downward with the arm 43 and will therefore move the yoke member upwardly around the axis of the shaft 37 to move the clutch face 19 upwardly. If when the clutch faces 18 and 19 first meet in this engaging movement, they are not properly alined to fully transmit motion therebetween, it will be seen that no full engagement can take place at that time. This fact will not however prevent the arm 43 from being moved to the extreme end of its stroke in this direction because the spring cushion is provided for that very purpose. The arm 43 can be moved downwardly until the tongue 56 and the groove next engage and then the arm 43 is again locked in its other extreme position and the spring 64 is pressing the arm 38 downwardly and the yoke member 36 upwardly. When the drive shaft 10 is first started the relative rotation motion given to the clutch face 19 carried thereby will cause the two clutch faces 18 and 19 to better aline to transmit power and at that moment the spring 64 will come into play and force these two faces together with a snap altho the arm 43 has been already locked.

Thus it will be seen that a clutch device is provided so that the members thereof can be locked in either of two extreme open and closed positions at will and that when the locking is in the closed position this action can take place even tho the clutch faces are not yet properly related to transmit power.

Simple and efficient means is provided so that as soon as there is a proper and sufficient relation between the face for the transmission of power they will be moved by the spring 64 into proper power engagement altho the other operating members are already locked closed. The device is simple, practical, and has been already successfully tried on an actual machine which has proved the simplicity, certainty, and accuracy of the operation of the parts as above described.

While the invention has been described in detail and with respect to a present preferred form thereof, it is not to be limited to such details and forms since many changes and modifications may be made and the invention embodied in other forms and modifications without departing from the spirit and scope of the invention in its broadest aspects. Hence it is desired to cover any and all forms and modifications coming within the language or scope of any one or more of the appended claims.

What is claimed, is,

1. A clutch device comprising a movable clutch member, a pivoted arm on which it is mounted for movement, an extension of the arm extending to the other side of the pivot axis from the member, an operating arm pivoted about the same axis as the first arm and lying on the same side of the axis as the extension, a spring cushion disposed between the arms on that side of the axis, to permit some independent relative movement, said operating arm having a segment rack at its end, a gear means to move the operating arm and connected to the segment rack, and means connected to the gear means to lock it in predetermined positions, the spring means or cushion disposed to snap the clutch member into mesh with its cooperating member even though the operating arm is already locked in one of its predetermined positions.

2. A clutch operating mechanism for motion picture projectors comprising a movable clutch element, a pivoted arm on which said element is mounted for movement, said arm having an extension on the other side of the pivot axis from said element, an operating arm pivoted about the same axis as the first arm and lying on the same side of the axis as the extension, a spring cushioning means disposed between said arms on that side of the axis, said cushioning means permitting of relative movement to some extent between said arms.

3. A clutch operating mechanism for motion picture projectors comprising a movable clutch element, a pivoted arm on which said element is mounted for movement, said arm having an extension on the other side of the pivot axis from said element, an operating arm pivoted about the same axis as the first arm and lying on the same side of the axis as the extension, a spring cushioning means disposed between said arms on that side of the axis, said cushioning means permitting of relative movement to some extent between said arms, means for moving said operating arm, and means for locking the moving means in predetermined positions.

4. A clutch operating mechanism for motion picture projectors which comprises a movable clutch member, an arm connected to said member and pivoted to the frame of the projector, an operating arm pivoted about the same axis as the first arm and lying on the opposite side of the axis from the clutch member, a spring casing disposed on said operating arm, a spring within said casing and engaging at one end with the other arm, said spring means permitting relative movement between said arms.

5. A clutch operating member for motion picture projectors comprising a movable clutch member, an arm connected at its end to said clutch member, and pivotally mounted on the frame of the projector at one side of said member, said arm having an extension on the side of the pivot axis opposite said member, a double limbed operating arm pivoted to the same axis as the first arm and lying on the same side thereof with its limbs lying respectively on opposite sides of said extension, a spring housing mounted across and on said limb portions and disposed over said extension, and a spring in said housing, one end of said spring engaging the extension and permitting instant relative movement between said arms.

6. A clutch operating member for motion picture projectors comprising a movable clutch member, an arm connected at its end to said clutch member, and pivotally mounted on the frame of the projector at one side of said member, said arm having an extension on the side of the pivot axis opposite said member, a double limbed operating arm pivoted to the same axis as the first arm and lying on the same side thereof with its limbs lying respectively on opposite sides of said extension, a spring housing mounted across and on said limb portions and disposed over said extension, and a spring in said housing, one end of said spring engaging the extension and permitting instant relative movement between said arms, means for moving said operating arm and means for locking said moving means in predetermined positions.

In testimony whereof, I have hereunto set my hand.

AUGUSTO DINA.